United States Patent
Fang et al.

(10) Patent No.: US 12,118,452 B2
(45) Date of Patent: Oct. 15, 2024

(54) TRAINING METHOD AND DEVICE BASED ON IMPROVED PROTOGRAPH NEURAL DECODER

(71) Applicant: Guangdong University of Technology, Guangzhou (CN)

(72) Inventors: Yi Fang, Guangzhou (CN); Yurong Wang, Guangzhou (CN); Liang Lv, Guangzhou (CN); Pingping Chen, Guangzhou (CN); Dingfei Ma, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/643,815

(22) Filed: Apr. 23, 2024

(65) Prior Publication Data
US 2024/0273343 A1   Aug. 15, 2024

(30) Foreign Application Priority Data
Nov. 29, 2023  (CN) .......................... 202311608109.9

(51) Int. Cl.
  *G06N 3/04*    (2023.01)
  *G06N 3/0464*  (2023.01)
(52) U.S. Cl.
  CPC .................. *G06N 3/0464* (2023.01)
(58) Field of Classification Search
  CPC ............................... G06N 3/04; G06N 3/0464
  See application file for complete search history.

(56) References Cited

U.S. PATENT DOCUMENTS

| | | | | |
|---|---|---|---|---|
| 2010/0205511 A1* | 8/2010 | Murakami | ........ | H03M 13/6362 714/781 |
| 2014/0325304 A1* | 10/2014 | Murakami | ............ | H03M 13/23 714/752 |

(Continued)

FOREIGN PATENT DOCUMENTS

| | | |
|---|---|---|
| CN | 103053116 B | 10/2016 |
| CN | 109462457 A | 3/2019 |

(Continued)

OTHER PUBLICATIONS

Han et al., "Deep Learning for Breaking the Trapping Sets in Low-Density Parity Check Codes", 2022, IEEE, vol. 70, No. 5., pp. 2909-2923 (Year: 2022).*

(Continued)

*Primary Examiner* — Paulinho E Smith

(57) ABSTRACT

A training method based on an improved protograph neural decoder includes the following steps: a to-be-trained decoding network is constructed based on an initial variable sub-network layer, an initial check sub-network layer and a preset shuffled belief-propagation (BP) sub-network layer; the initial variable sub-network layer, the initial check sub-network layer and the preset shuffled BP sub-network layer are updated and trained by calculating log-likelihood ratio (LLR) based on a preset mean square error loss function and a preset decoder objective function to obtain a target protograph neural decoder; and the preset mean square error loss function is configured to calculate a loss value between output information of the check sub-network layer and the preset shuffled BP sub-network layer. The target protograph neural decoder includes an optimized variable sub-network layer, an optimized check sub-network layer and an optimized shuffled BP sub-network layer. A training device is also provided.

4 Claims, 7 Drawing Sheets

(56) References Cited

U.S. PATENT DOCUMENTS

| | | | | |
|---|---|---|---|---|
| 2016/0248443 A1* | 8/2016 | Murakami | ............ | H03M 13/23 |
| 2017/0141796 A1* | 5/2017 | Koike-Akino | .... | H03M 13/6588 |
| 2017/0294923 A1* | 10/2017 | Bhatia | ................ | G06F 11/1076 |
| 2018/0167085 A1* | 6/2018 | Murakami | .......... | H03M 13/235 |
| 2019/0140661 A1* | 5/2019 | Calabrò | ............... | H03M 13/114 |
| 2019/0273511 A1* | 9/2019 | Usatyuk | .............. | H03M 13/616 |

FOREIGN PATENT DOCUMENTS

| | | | | |
|---|---|---|---|---|
| CN | 110730008 A | 1/2020 | | |
| CN | 110995277 A | 4/2020 | | |
| CN | 113872610 A | 12/2021 | | |
| CN | 114359631 A | 4/2022 | | |
| CN | 115483936 A | 12/2022 | | |
| WO | 2019134553 A1 | 7/2019 | | |
| WO | WO-2021061574 A1 * | 4/2021 | ......... | H03M 13/1111 |
| WO | 2021204163 A1 | 10/2021 | | |

OTHER PUBLICATIONS

Li et al, "A Recipe of Training Neural Network based LDPC Decoders", Aug. 9, 2022, ArXIV, pp. 1-8 (Year: 2022).*
Hasani et al., "Reduced-Complexity Decoding Implementation of QC-LDPC codes with Modified Shuffling", 2021, Journal of Wireless Cam Network, pp. 1-14 (Year: 2021).*

* cited by examiner

TRAINING METHOD AND DEVICE BASED ON IMPROVED PROTOGRAPH NEURAL DECODER

CROSS-REFERENCE TO RELATED APPLICATIONS

This application claims the benefit of priority from Chinese Patent Application No. 202311608109.9, filed on Nov. 29, 2023. The content of the aforementioned application, including any intervening amendments thereto, is incorporated herein by reference in its entirety.

TECHNICAL FIELD

This application relates to channel coding, and more specifically to a training method and device based on an improved protograph neural decoder.

BACKGROUND

Protograph low-density parity-check (LDPC) codes, as one of the channel coding schemes, have been widely used in various communication scenarios, such as the Internet of Things (IoT), data storage systems, and 5G new radio systems. The protograph LDPC codes can reach a performance close to the Shannon capacity limit through iterative decoding algorithms. Among the existing iterative decoders, the belief-propagation (BP) decoder can achieve the best performance, but it has high computational complexity. In contrast, the normalized min-sum (NMS) decoder and the offset min-sum (OMS) decoder are more widely used in practical systems due to their low complexity. However, the traditional NMS decoder and OMS decoder may show a reduced performance when used in practical systems. Therefore, the neural decoder, as a key technology that can maximize the performance of NMS decoder and OMS decoder without increasing the complexity, has attracted extensive attention from academia and industry.

Nonetheless, most of the existing LDPC codes are non-regular and require a single-stream structure for decoding, which usually requires more hidden layers, resulting in a higher complexity and difficult implementations in hardware. In addition, during the construction process of existing LDPC codes, the existence of variable points (VNs) of degree 1 can lead to failures in convergence of iterative decoding or in fast optimization of network parameters, which results in poor network training efficiency.

SUMMARY

An objective of the present disclosure is to provide a training method and device based on an improved protograph neural decoder to overcome the technical problems of high complexity, failures in convergence during training and low training efficiency when adopting a single-stream structure in the prior art.

Technical solutions of the present disclosure are described below.

In a first aspect, this application provides a training method and device based on an improved protograph neural decoder, comprising:
constructing a to-be-trained decoding network based on an initial variable sub-network layer, an initial check sub-network layer and a preset shuffled belief-propagation (BP) sub-network layer, wherein the to-be-trained decoding network comprises a plurality of hidden layers and an input convolutional layer; and
updating and training the initial variable sub-network layer, the initial check sub-network layer and the preset shuffled BP sub-network layer by calculating log-likelihood ratio (LLR) based on a preset mean square error loss function and a preset decoder objective function to obtain a target protograph neural decoder;
wherein the preset mean square error loss function is configured to calculate a loss value between output information of the check sub-network layer and output information of the preset shuffled BP sub-network layer; and
the target protograph neural decoder comprises an optimized variable sub-network layer, an optimized check sub-network layer and an optimized shuffled BP sub-network layer.

In some embodiments, the to-be-trained decoding network is constructed through steps of:
successively connecting the initial variable sub-network layer, the initial check sub-network layer and the preset shuffled BP sub-network layer to obtain a hidden network group; and
successively connecting a plurality of hidden network groups to form a hidden layer; and successively connecting the plurality of hidden layers after the input convolutional layer to obtain the to-be-trained decoding network.

In some embodiments, the step of updating and training the initial variable sub-network layer, the initial check sub-network layer and the preset shuffled BP sub-network layer by calculating LLR based on a preset mean square error loss function and a preset decoder objective function to obtain a target protograph neural decoder comprises:
mapping preset channel initial information to the input convolutional layer of the to-be-trained decoding network for convolutional computation according to a Tanner graph to obtain input convolutional information;
updating and analyzing the input convolutional information through the initial variable sub-network layer to obtain variable output information and a variable LLR value; and sending the variable output information and the variable LLR value to the initial check sub-network layer and the preset shuffled BP sub-network layer;
updating and analyzing the variable output information and the variable LLR value through the initial check sub-network layer and the preset shuffled BP sub-network layer to obtain a checked LLR value, checked output information and shuffled output information, wherein the checked LLR value is configured for parameter updating calculation of a next initial variable sub-network layer;
optimizing network training according to the checked output information and the shuffled output information based on the preset mean square error loss function and the preset decoder objective function to obtain the target protograph neural decoder.

In some embodiments, before mapping the preset channel initial information to the input convolutional layer of the to-be-trained decoding network for convolutional computation according to the Tanner graph to obtain the input convolutional information, the training method further comprises:
encoding an original information bit sequence with a protograph encoder to obtain a coded bit sequence;

performing signal modulation on the coded bit sequence with a binary phase shift keying modulator to obtain a modulated symbol sequence;

analyzing channel transmission characteristics of the modulated symbol sequence based on additive white Gaussian noise (AWGN) to obtain channel transmission information; and performing probabilistic analysis on the channel transmission information to obtain the preset channel initial information.

In some embodiments, after the step of updating and training the initial variable sub-network layer, the initial check sub-network layer and the preset shuffled BP sub-network layer by calculating the LLR based on the preset mean square error loss function and the preset decoder objective function to obtain the target protograph neural decoder, the training method further comprises:

eliminating the optimized shuffled BP sub-network layer in the target protograph neural decoder, and providing an output convolutional layer at an end of each of the plurality of hidden layers to obtain a simulated protograph neural decoder, wherein the output convolutional layer comprises a plurality of neurons; and performing signal decoding and simulation with the simulated protograph neural decoder; and computing a posteriori variable LLR through the output convolutional layer based on output information of a last optimized check sub-network layer to obtain a simulated prediction result.

In a second aspect, this application provides a training device based on an improved protograph neural decoder, comprising:

a network construction unit; and a network training unit;

wherein the network construction unit is configured to construct a to-be-trained decoding network based on an initial variable sub-network layer, an initial check sub-network layer and a preset shuffled BP sub-network layer; and the network training unit is configured to update and train the initial variable sub-network layer, the initial check sub-network layer and the preset shuffled BP sub-network layer by calculating LLR based on a preset mean square error loss function and a preset decoder objective function to obtain a target protograph neural decoder;

wherein the preset mean square error loss function is configured to calculate a loss value between output information of the check sub-network layer and output information of the preset shuffled BP sub-network layer; and the target protograph neural decoder comprises an optimized variable sub-network layer, an optimized check sub-network layer and an optimized shuffled BP sub-network layer.

In some embodiments, the network construction unit is configured to successively connect the initial variable sub-network layer, the initial check sub-network layer and the preset shuffled BP sub-network layer to obtain a hidden network group, successively connect a plurality of hidden network groups to form a hidden layer, and successively connect the plurality of hidden layers after the input convolutional layer to obtain the to-be-trained decoding network.

In some embodiments, the network training unit comprises:

an input calculation sub-unit;

a first updating sub-unit;

a second updating sub-unit; and an optimizing sub-unit;

wherein the input calculation sub-unit is configured to map preset channel initial information to the input convolutional layer of the to-be-trained decoding network for convolutional computation according to a Tanner graph to obtain input convolutional information;

the first updating sub-unit is configured to update and analyze the input convolutional information through the initial variable sub-network layer to obtain variable output information and a variable LLR value, and send the variable output information and the variable LLR value to the initial check sub-network layer and the preset shuffled BP sub-network layer;

the second updating sub-unit is configured to update and analyze the variable output information and the variable LLR value through the initial check sub-network layer and the preset shuffled BP sub-network layer to obtain a checked LLR value, checked output information and shuffled output information, wherein the checked LLR value is configured for parameter updating calculation of a next initial variable sub-network layer; and the optimizing sub-unit is configured to optimize network training according to the checked output information and the shuffled output information based on the preset mean square error loss function and the preset decoder objective function to obtain the target protograph neural decoder.

In some embodiments, the training device further comprises:

a bit encoding unit;

a signal modulation unit;

a channel transmission unit; and a computational analysis unit;

wherein the bit encoding unit is configured to encode an original information bit sequence with a protograph encoder to obtain a coded bit sequence;

the signal modulation unit is configured to perform signal modulation on the coded bit sequence with a binary phase shift keying modulator to obtain a modulated symbol sequence;

the channel transmission unit is configured to analyze channel transmission characteristics of the modulated symbol sequence based on AWGN to obtain channel transmission information; and the computational analysis unit is configured to perform probabilistic analysis on the channel transmission information to obtain the preset channel initial information.

In some embodiments, the training device further comprises:

a network regulation unit; and a simulation prediction unit;

wherein the network regulation unit is configured to eliminate the optimized shuffled BP sub-network layer in the target protograph neural decoder, and provide an output convolutional layer at an end of each of the plurality of hidden layers to obtain a simulated protograph neural decoder, wherein the output convolutional layer comprises a plurality of neurons; and the simulation prediction unit is configured to perform signal decoding and simulation with the simulated protograph neural decoder, and compute a posteriori variable LLR through the output convolutional layer based on output information of a last optimized check sub-network layer to obtain a simulated prediction result.

Compared with the prior art, the present disclosure has the following advantages.

The present disclosure provides a training method and device based on an improved protograph neural decoder. The training method includes the following steps. A to-be-trained decoding network is constructed based on an initial variable sub-network layer, an initial check sub-network layer and a preset shuffled BP sub-network layer, where the to-be-trained decoding network comprises a plurality of hidden layers and an input convolutional layer. The initial variable sub-network layer, the initial check sub-network layer and the preset shuffled BP sub-network layer are updated and trained by calculating LLR based on a preset mean square error loss function and a preset decoder objective function to obtain a target protograph neural decoder, where the preset mean square error loss function is configured to calculate a loss value between output information of the check sub-network layer and the preset shuffled BP sub-network layer; and the target protograph neural decoder comprises an optimized variable sub-network layer, an optimized check sub-network layer and an optimized shuffled BP sub-network layer.

The training method based on the improved protograph neural decoder provided in the present application improves the network structure of the protograph LDPC neural decoder based on a preset shuffled BP sub-network layer. The preset shuffled BP sub-network layer can ensure the training efficiency of the network while reducing the training complexity by increasing the network shunt. Moreover, the preset mean-square error loss function is adopted herein instead of the loss function in the prior art to optimize the network training process, which can accelerate the convergence speed of network training and improve the training efficiency. Therefore, this application can solve the technical problems of higher overall complexity and lower training efficiency due to the difficulty of convergence in the training process when adopting the inefficient single-stream structure of the prior art.

DETAILED DESCRIPTION OF EMBODIMENTS

To enable one of ordinary skill in the art to better understand the objects, technical solutions, and advantages of the present application, the present application will be described clearly and completely below with reference to the accompanying drawings and embodiments. Obviously, described herein are only some embodiments of the present application, instead of all embodiments. Based on the embodiments in this application, all other embodiments obtained by one of ordinary skill in the art without making creative effort shall fall within the scope of this application.

Figure 1:
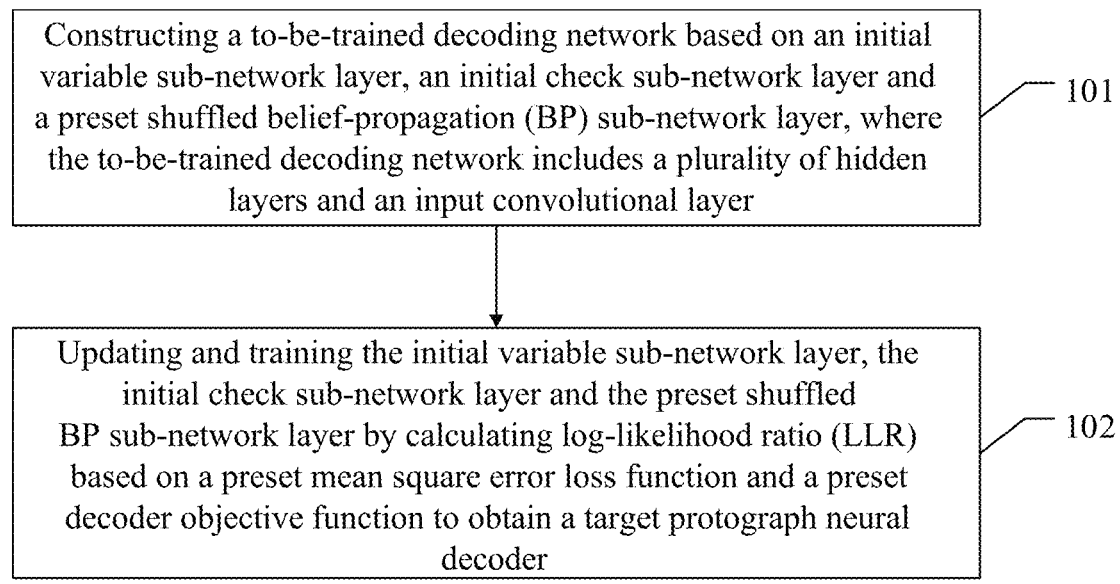
FIG. 1 is a flow chart of a training method based on an improved protograph neural decoder according to an embodiment of the present disclosure.

Referring to FIG. 1, a training method based on an improved protograph neural decoder is provided, which includes the following steps.

(S101) A to-be-trained decoding network is constructed based on an initial variable sub-network layer, an initial check sub-network layer and a preset shuffled belief-propagation (BP) sub-network layer, where the to-be-trained decoding network includes a plurality of hidden layers and an input convolutional layer.

Further, the step (S101) includes the following steps.

The initial variable sub-network layer, the initial check sub-network layer and the preset shuffled BP sub-network layer are successively connected to obtain a hidden network group.

A plurality of hidden network groups are successively connected to form a hidden layer, and the plurality of hidden layers are successively connected after the input convolutional layer to obtain the to-be-trained decoding network.

Figure 3:
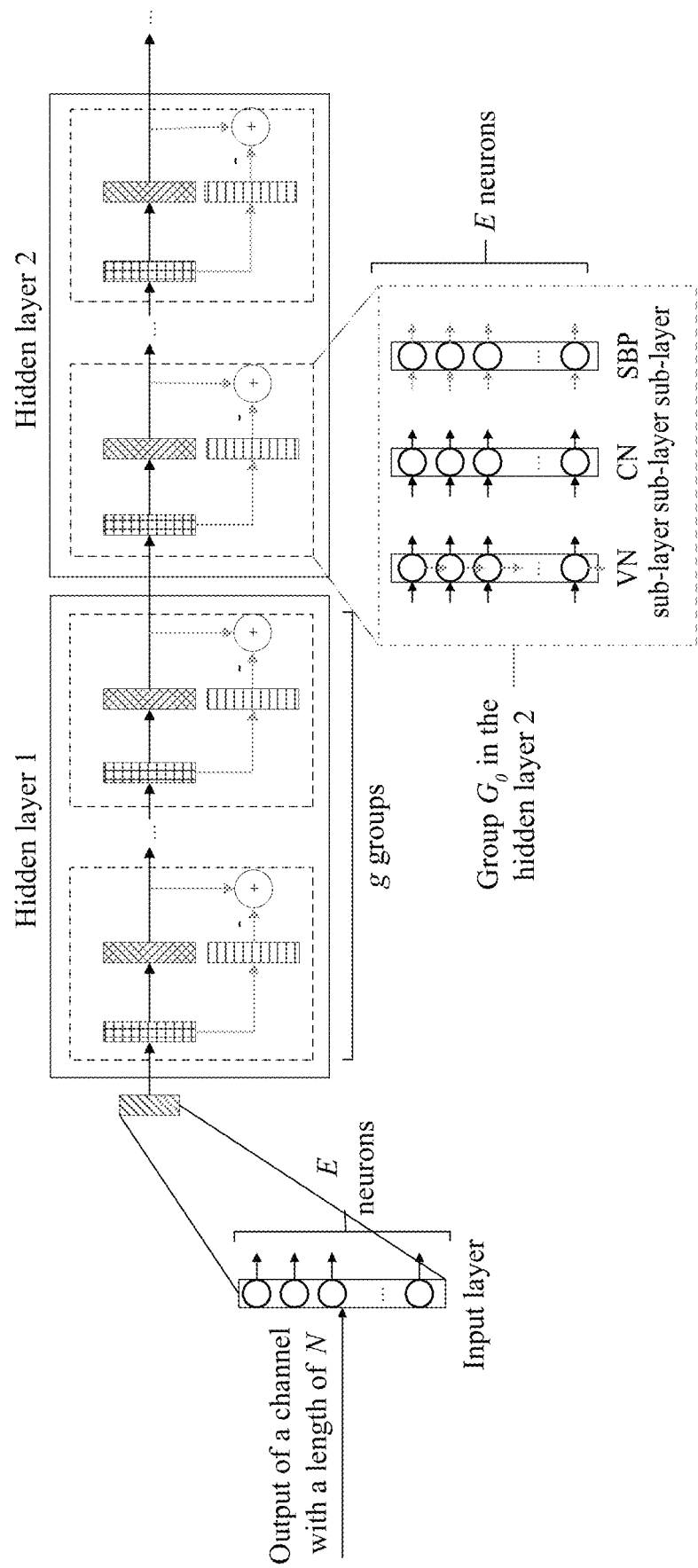
FIG. 3 is a schematic diagram of a to-be-trained decoding network according to an embodiment of the present disclosure.

Referring to FIG. 3, it assumes that each hidden layer can be divided into g hidden network groups, and each hidden network group consists of an initial variable sub-network layer $1_{v,\gamma}^{(t)}$, an initial check sub-network layer $1_{c_1,\gamma}^{(t)}$ and a preset shuffled BP sub-network layer $1_{c_2,\gamma}^{(t)}$ connected in sequence, where g represents a preset value, which can be set according to the actual situation and is not limited herein; t=1, 2, . . . , T, t represents a layer index number of the hidden layer, and T is the maximum number of layers of the hidden layer; and γ=0, 1, . . . , g−1, γ denotes an index of each hidden network group $G_\gamma$, and each sub-network layer in the group contains E neurons. It can be understood that FIG. 3 merely schematically shows two hidden layers, and the number of the hidden layer can be configured according to the actual needs and is not limited herein. In addition, for convenient description, in this embodiment, the variable sub-network layer is expressed as a VN sub-layer, the check sub-network layer is expressed as a CN sub-layer, and the preset shuffled BP sub-network layer is expressed as an SBP sub-layer.

In addition, unlike the existing neural decoders, in this embodiment, the last initial check sub-network layer of the $T^{th}$ hidden layer of the to-be-trained decoding network and the preset shuffled BP sub-network layer are jointly set to be the output layer, that is, the output information of the two sub-network layers is required to be used for the subsequent computation and updating process of the network.

It should be noted that the to-be-trained decoding network in this embodiment further includes an input convolutional layer including E neurons, in addition to a plurality of hidden layers. The number E of neurons is determined based on the number of edges in the Tanner graph. For example, the number of edges in the Tanner graph is directly valued as the number E of neurons.

(S102) The initial variable sub-network layer, the initial check sub-network layer and the preset shuffled BP sub-network layer are updated and trained by calculating log-likelihood ratio (LLR) based on a preset mean square error loss function and a preset decoder objective function to obtain a target protograph neural decoder.

The preset mean square error loss function is configured to calculate a loss value between output information of the check sub-network layer and the preset shuffled BP sub-network layer. The target protograph neural decoder includes an optimized variable sub-network layer, an optimized check sub-network layer and an optimized shuffled BP sub-network layer.

Further, the step (S102) includes the following steps.

Preset channel initial information is mapped to the input convolutional layer of the to-be-trained decoding network for convolutional computation according to a Tanner graph to obtain input convolutional information.

The input convolutional information is updated and analyzed through the initial variable sub-network layer to obtain variable output information and a variable LLR value. The variable output information and the variable LLR value are sent to the initial check sub-network layer and the preset shuffled BP sub-network layer.

The variable output information and the variable LLR value are updated and analyzed through the initial check sub-network layer and the preset shuffled BP sub-network layer to obtain a checked LLR value, checked output information and shuffled output information, where the checked LLR value is configured for parameter updating calculation of a next initial variable sub-network layer.

Network training is optimized according to the checked output information and the shuffled output information based on the preset mean square error loss function and the preset decoder objective function to obtain the target protograph neural decoder.

Further, before mapping the preset channel initial information to the input convolutional layer of the to-be-trained decoding network for convolutional computation according to the Tanner graph to obtain the input convolutional information, the training method further includes the following steps.

An original information bit sequence is encoded with a protograph encoder to obtain a coded bit sequence.

Signal modulation is performed on the coded bit sequence with a binary phase shift keying modulator to obtain a modulated symbol sequence.

Channel transmission characteristics of the modulated symbol sequence are analyzed based on additive white Gaussian noise (AWGN) to obtain channel transmission information.

Probabilistic analysis is performed on the channel transmission information to obtain the preset channel initial information.

Figure 4:
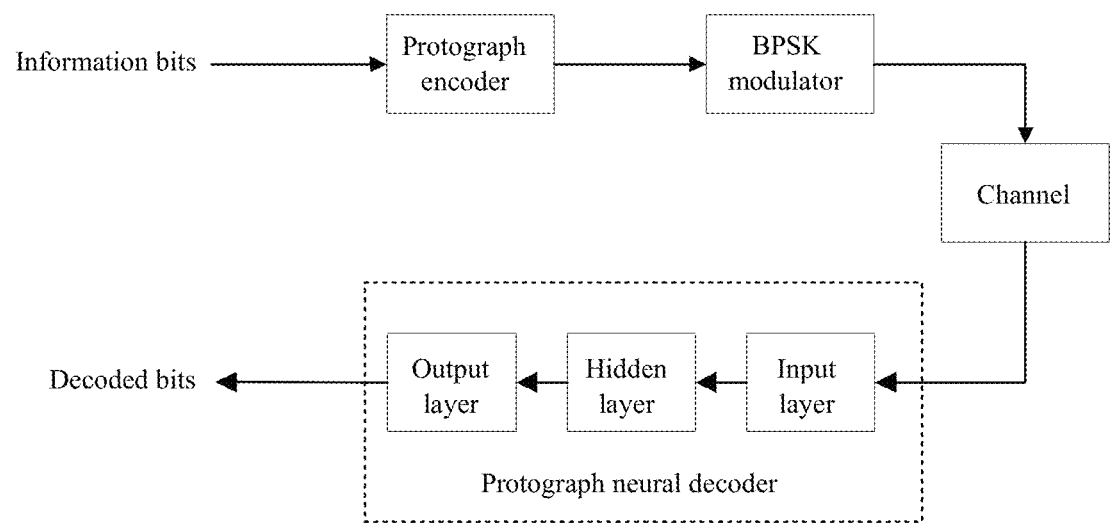
FIG. 4 schematically shows a protograph neural Low-Density Parity-Check (LDPC) decoding system according to an embodiment of the present disclosure.

It should be noted that the to-be-trained decoding network of this embodiment is used for signal decoding, and the signal input into this network is the preset channel initial information obtained based on encoding, modulation and channel transmission. The overall processing flow of the information bits refers to FIG. 4. The original information bit sequence $x=\{x_1, x_2 \ldots, x_\tau, \ldots, x_N\}$ with a length of K=N−M is encoded by the protograph encoder to obtain a coded bit sequence $z=\{z_1, z_2, \ldots, z_\tau, \ldots, z_N\}$ with a length of N. The coded bit sequence is modulated by a binary phase shift keying (BPSK) modulator to obtain a symbol sequence suitable for channel transmission, i.e., the modulated symbol sequence $s=\{s_1, s_2, \ldots, s_\tau, \ldots, s_N\}$. Since there are different factors in the channel transmission process, which will bring some noise effects to the signal, additive Gaussian white noise (AWGN) $w_\tau$ is introduced herein to obtain the channel transmission information $y_\tau$, which is specifically expressed as:

$$y_\tau = s_\tau + w_\tau;$$

where $s_\tau$ represents a signal element in a modulated symbol sequence $s=\{s_1, s_2, \ldots, s_\tau, \ldots, s_N\}$ and $s_\tau = (-1)z_\tau \in \{-1, 1\}$, $\tau=1, 2, \ldots, N$; the additive Gaussian white noise $w_\tau$ has a mean of 0 and a variance of $\sigma^2 = N_0/2$, i.e., $w_\tau \sim (0, \sigma^2)$; and $N_0$ represents noise power spectral density.

Furthermore, if the protograph is expressed as G=(V, C, E) which includes a set V of N variable points, a set C of M check points, and a set E of edges connecting the variable points and the check points. The matrix corresponding to the protograph is referred to as a basis matrix B. For a given M×N basis matrix $B=[b_{i,j}]b_{i,j}$ represents a number of edges connecting the variable points $v_j$ and the check points $c_i$, and the number of edges is denoted as $E_b$. The corresponding bit error ratio is expressed as R=1−M/N The generating process of LDPC codes of the protograph can be understood as an operation process of copying and interleaving. If the number of copying is denoted as F, then the number of edges of the new protograph can be calculated by $E=E_b \times F$. Since the number of neurons is in one-to-one correspondence to the number of edges, both the number of neurons and the number of edges in the present embodiment can be expressed by E, which will not be explained subsequently.

For the received channel transmission information $y_\tau$ with a length of N, the following calculation is also required:

$$l_\tau = \ln \frac{Pr(y_\tau | z_\tau = 0)}{Pr(y_T | z_T = 1)} = \frac{2y_\tau}{\sigma^2};$$

where Pr(·) represents a probability calculation function; $Pr(y_\tau | z_\tau)$ represents a transfer probability from the $\tau^{th}$ coded bit to the $\tau^{th}$ received signal value; and $l_\tau$ represents preset channel initial information.

It should be noted that the Tanner graph is a factor graph corresponding to a larger check matrix generated from a base matrix corresponding to the protograph through copying and interleaving, which can be obtained based on the prior art and is not discussed herein. According to the Tanner diagram, the preset channel initial information $l_\tau$ can be mapped to the input convolutional layer of the to-be-trained decoding network for convolutional computation to obtain the input convolutional information.

In the sub-network layer parameter training calculation stage, the input convolutional information will be input to the first VN sub-layer $l_{v,0}^{(1)}$ for processing. The $\tau^{th}$ VN sub-layer and the $\delta^{th}$ CN sub-layer are referred to as $VN^\tau$ and $CN^\delta$, respectively. For example, if VN1 is connected to CN1, CN3, CN4, CN6, and CN7, the LLR value of the VN1 will be present in the neurons of $n_1=(v_1, c_1)$ $n_2$ $(v_1, c_3)$, $n_1=(v_1, c_4)$, $n_1=(v_1, c_6)$ and $n_1=(v_1, c_7)$ at the same time.

The initial variable sub-network layer and the initial check sub-network layer, i.e., the VN sub-layer and the CN sub-layer, experience information exchange with each other to realize parameter updating and computation. Unlike the prior art, a preset shuffled BP sub-network layer (i.e., the SBP sub-layer) is introduced herein. The specific updating and computation analysis is performed as follows. The first hidden layer is taken as an example, the first VN sub-layer $l_{v,0}^{(1)}$ in the first hidden network group performs update and convolutional computation based on the input convolutional information, and send the obtained variable output information and the variable LLR value updated by the VN sub-layer to the first CN sub-layer $l_{c_1,0}^{(1)}$ and the first SBP sub-layer $l_{c_2,0}^{(1)}$ in the group, respectively. The first CN sub-layer and the first SBP sub-layer can both carry out the convolutional computation and parameter updating based on the variable output information and the variable LLR value. Both of the CN sub-layer and the SBP sub-layer can obtain the corresponding LLR values and output values. The check LLR value and the check output information obtained by the CN sub-layer, and the shuffled output information obtained by the SBP sub-layer are mainly analyzed herein. The check LLR value output from the first CN sub-layer can be input to the first VN sub-layer $l_{v,1}^{(1)}$ in the next hidden network group to participate in the parameter update training. The check output information and the shuffled output information are used in the calculation of the loss value based on the preset mean square error loss function, which is combined with the preset decoder objective function to realize the optimization training of the network. The sub-network layers in each hidden network group can complete the parameter training and calculation through the above method. Multiple hidden network groups of each hidden layer and all hidden layers are trained and updated based on the above method until the training of all network layers is completed, so that the target protograph neural decoder is obtained.

For the hidden network group $G_\gamma$ in each hidden layer t, the parameter updating process of the VN sub-layer in the $\varepsilon^{th}$ neuron $n_\varepsilon = (v_\tau, c_\delta)$ of $l_{v,\gamma}^{(t)}$ is expressed by:

$$l_{n_\varepsilon=(v_\tau,c_\delta)}^{(l_{v,\gamma}^{(t)})} = l_\tau + \sum_{n_{\varepsilon'}=(v_\tau,c_\delta),c_\delta \neq c_\delta} l_{n_{\varepsilon'}}^{(l_{c_1,\gamma}^{(t-1)})};$$

where $n_{\varepsilon'} = (v_\tau, c_\delta)$, $c_\delta \neq c_\delta$ represents all other neurons in $l_{c_1,\gamma}^{(t-1)}$ except the neuron $n_\varepsilon = (v_\tau, c_\delta)$.

The first hidden layer is taken as an example. Before the parameter updating starts, for all $n_{\varepsilon'}$, $$l_{n_{\varepsilon'}}^{(l_{c_1,0}^{(0)})} = 0.$$

When some of the CN sub-layers in the hidden network group have finished updating, for the neurons that have already participated in the updating, $$l_{n_{\varepsilon'}}^{(l_{c_1,\gamma}^{(0)})} \neq 0,$$

and for the neurons that have not yet participated in the updating, $$l_{n_{\varepsilon'}}^{(l_{c_1,\gamma}^{(0)})} \neq 0.$$

As the index value $\gamma$ of the hidden network panel increases, the number of neurons with zero values will gradually decrease until all neurons are free of zero values. After the last CN sub-layer finishes updating, for all $n_{\varepsilon'}$, $$l_{n_{\varepsilon'}}^{(l_{c_1,\gamma}^{(t-1)})} \neq 0$$

Similarly, the parameter updating process of the CN sub-layer in the $\varepsilon^{th}$ neuron $n_\varepsilon = (v_\tau, c_\delta)$ of $l_{c_1,\gamma}^{(t)}$ can be expressed as:

$$l_{n_\varepsilon=(v_\tau,c_\delta)}^{(l_{c_1,\gamma}^{(t)})} = s_{n_\varepsilon=(v_\tau,c_\delta)}^{(l_{c_1,\gamma}^{(t)})} \times ReLU\left(r_{n_\varepsilon=(v_\tau,c_\delta)}^{(l_{c_1,\gamma}^{(t)})} - \beta_\lambda^{(t)}\right);$$

where:

$$s_{n_\varepsilon=(v_\tau,c_\delta)}^{(l_{c_1,\gamma}^{(t)})} = \prod_{\substack{n_{\varepsilon'}=v_{\tau'} \neq v_\tau \\ \tau' < g+\gamma}} sgn\left(l_{n_{\varepsilon'}}^{(l_{v,\gamma}^{(t)})}\right) \times \prod_{\substack{n_{\varepsilon'}=(v_{\tau'},c_\delta),v_{\tau'} \neq v_\tau \\ \tau' \geq g+\gamma}} sgn\left(l_{n_{\varepsilon'}}^{(l_{v,\gamma}^{(t-1)})}\right); \text{ and}$$

$$r_{n_\varepsilon=(v_\tau,c_\delta)}^{(l_{c_1,\gamma}^{(t)})} = \min\left(\min_{\substack{n_{\varepsilon'}=(v_{\tau'},c_\delta),v_{\tau'} \neq v_\tau \\ \tau' < g+\gamma}}\left|l_{n_{\varepsilon'}}^{(l_{v,\gamma}^{(t)})}\right|, \min_{\substack{n_{\varepsilon'}=(v_{\tau'},c_\delta),v_{\tau'} \neq v_\tau \\ \tau' \geq g+\gamma}}\left|l_{n_{\varepsilon'}}^{(l_{v,\gamma}^{(t-1)})}\right|\right);$$

where $n_{\varepsilon'} = (v_{\tau'}, c_\delta)$, $v_{\tau'} \neq v_\tau$ represents all other neurons except $n_\varepsilon = (v_\tau, c_\delta)$; sgn(·) represents symbolic function computation; and ReLu(·) represents an activation function, which can be expressed as:

$$ReLU(x) = \max(x, 0);$$

where $\beta_\lambda^{(t)}$ represents an offset term factor, which is a shared offset parameter in a neuron set $\lambda$ in a hidden layer t; an edge corresponding to each neuron in the set is replicated with the same edge of a base matrix $B=[b_{i,j}]$; and an index of the set is expressed as $\lambda=1, 2, \ldots, E_B$, where $E_B=E/F$; and F is the number of replication.

Meanwhile, the parameter updating process of the SBP sub-layer in the $\varepsilon^{th}$ neuron $n_\varepsilon = (v_\tau, c_\delta)$ of $l_{c_2,\gamma}^{(t)}$ can be expressed as:

$$l_{n_\varepsilon=(v_\tau,c_\delta)}^{(l_{c_2,\gamma}^{(t)})} = 2\tanh^{-1}\left(\prod_{\substack{n_{\varepsilon'}=(v_{\tau'},c_\delta),v_{\tau'} \neq v_\tau \\ \tau' < g+\gamma}} \tanh\left(\frac{l_{n_{\varepsilon'}}^{(l_{v,\gamma}^{(t)})}}{2}\right) \times \prod_{\substack{n_{\varepsilon'}=(v_{\tau'},c_\delta),v_{\tau'} \neq v_\tau \\ \tau' \geq g+\gamma}} \tanh\left(\frac{l_{n_{\varepsilon'}}^{(l_{v,\gamma}^{(t-1)})}}{2}\right)\right).$$

Based on the above parameter updating formulas for the VN sub-layer, CN sub-layer and SBP sub-layer, the parameter updating of each sub-network layer can be realized.

It should be noted that the calculation of the loss value between the check output information and the shuffled output information based on the preset mean square error loss function is essentially to calculate the difference in the CN message between the offset min-sum (OMS) algorithm and the belief-propagation (BP) algorithm, rather than relying on the cross-entropy function to calculate the difference. Therefore, it can avoid the problem of slow network convergence caused by using the cross-entropy function to calculate the loss value.

Specifically, since the CN sub-layer $l_{c_1,g-1}^{(t)}$ and the SBP sub-layer $l_{c_2,g-1}^{(t)}$ are connected to the same VN sub-layer $l_{v_1,g-1}^{(t)}$, the CN sub-layer $l_{c_1,g-1}^{(t)}$ and the SBP sub-layer $l_{c_2,g-1}^{(t)}$ receive the same message from the VN sub-layer $l_{v,g-1}^{(t)}$. Therefore, for the $\varepsilon^{th}$ neuron of $l_{c_1,g-1}^{(t)}$ and $l_{c_2,g-1}^{(t)}$, the difference of the CN update is expressed as:

$$d_{n_\varepsilon=(v_\tau,c_\delta)}^{(t)} = I_{n_\varepsilon=(v_\tau,c_\delta)}^{(l_{c_1,g-1}^{(t)})} - I_{n_\varepsilon=(v_\tau,c_\delta)}^{(l_{c_2,g-1}^{(\tau)})};$$

where $$I_{n_\varepsilon=(v_\tau,c_\delta)}^{(l_{c_1,g-1}^{(t)})} \text{ and } I_{n_\varepsilon=(v_\tau,c_\delta)}^{(l_{c_2,g-1}^{(t)})}$$

are calculated by the above parameter updating formulas of the CN sub-layer and the SBP sub-layer, respectively, and the specific calculations are not further described.

After calculating the differences of all neurons based on the above formulas, the average of these differences is calculated in combination with the mean square error (MSE) function, i.e., the preset mean square error loss function based on the MSE function defined by this embodiment is expressed as:

$$L\left(I^{(l_{c_1,g-1}^{(t)})}, I^{(l_{c_2,g-1}^{(t)})}\right) = \frac{1}{E}\sum_{\varepsilon=1}^{E}\left|I_{n_\varepsilon=(v_\tau,c_\delta)}^{(l_{c_1,g-1}^{(t)})} - I_{n_\varepsilon=(v_\tau,c_\delta)}^{(l_{c_2,g-1}^{(t)})}\right|^2;$$

where $I^{(l_{c_1,g-1}^{(t)})} = \left\{I_{n_1}^{(l_{c_1,g-1}^{(t)})}, I_{n_2}^{(l_{c_1,g-1}^{(t)})}, \ldots, I_{n_E}^{(l_{c_1,g-1}^{(t)})}\right\}$, and $$I^{(l_{c_2,g-1}^{(t)})} = \left\{I_{n_1}^{(l_{c_2,g-1}^{(t)})}, I_{n_2}^{(l_{c_2,g-1}^{(t)})}, \ldots, I_{n_E}^{(l_{c_1,g-1}^{(t)})}\right\}.$$

Based on the preset mean square error loss function, it can be seen that the binary classification problem in a neural decoding network can be reduced to a regression problem that reduces the CN update differences. Assuming the set $\beta^{(t)} = \{\beta_1^{(t)}, \beta_2^{(t)}, \ldots, \beta_{E_B}^{(t)}\}$ of offset term factors in the hidden layer t, then the preset decoder objective function of the to-be-trained decoding network in this embodiment can be expressed as:

$$\beta^{(t)} = \arg\min L\left(I^{(l_{c_1,g-1}^{(t)})}, I^{(l_{c_2,g-1}^{(t)})}\right).$$

In this embodiment, the ADAM optimization algorithm can be used to update the offset term factors $\beta^{(t)}$ to continuously optimize the to-be-trained decoding network. Finally, the optimized and updated offset term factor $\beta^{(t)}$ can be obtained, other than outputting the target protograph neural decoder.

Further, after the step (S102), the training method includes the following steps.

The optimized shuffled BP sub-network layer in the target protograph neural decoder is eliminated, and an output convolutional layer is provided at an end of each of the plurality of hidden layers to obtain a simulated protograph neural decoder, where the output convolutional layer includes a plurality of neurons; and Signal decoding and simulation is performed with the simulated protograph neural decoder, and a posteriori variable LLR is calculated through the output convolutional layer based on output information of a last optimized check sub-network layer to obtain a simulated prediction result.

Figure 5:
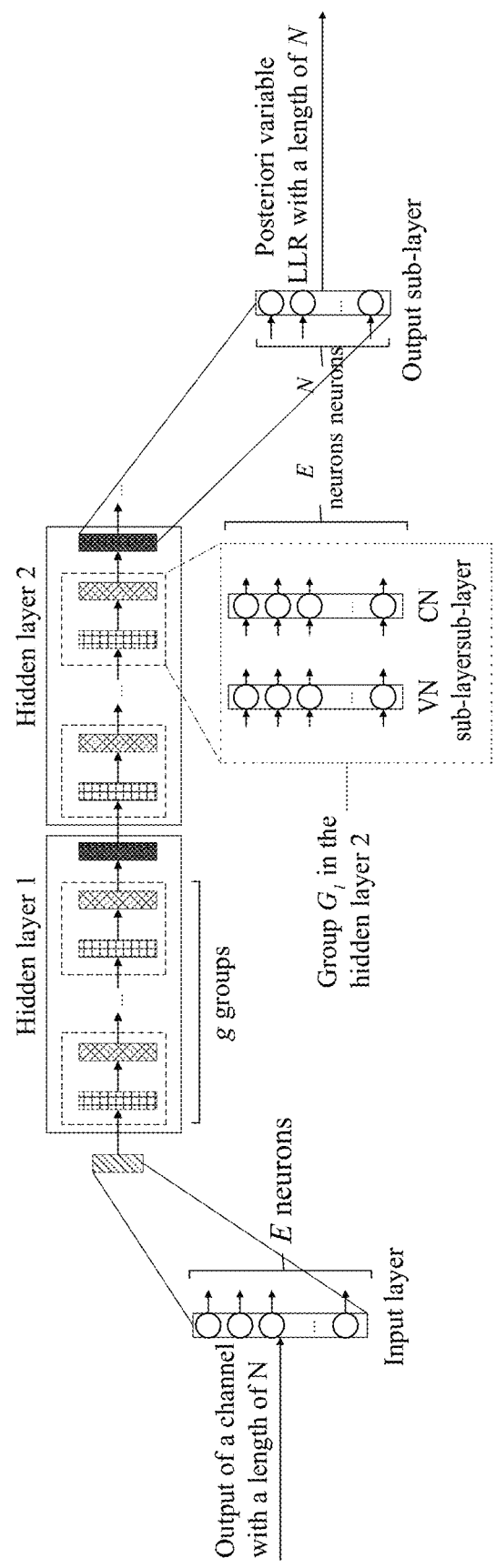
FIG. 5 is a schematic diagram of a target protograph neural decoder obtained by training according to an embodiment of the present disclosure at a simulation phase.

As a new embodiment, the present application can make further structural improvements to the trained target protograph neural decoder. Referring to FIG. 5, in the training phase of the neural decoder, the network depth required in the simulation phase is reduced by increasing the network shunt and calculating additional SBP updates. The SBP sub-layers are directly eliminated in the simulation phase, i.e., the shuffled BP sub-network layer is optimized, which can reduce the network complexity of each hidden network group in each hidden layer and thus improve the simulation efficiency.

In addition, in the present embodiment, an output convolutional layer $l_o^{(t)}$ is provided at the end of each hidden layer. The output convolutional layer $l_o^{(t)}$ contains N neurons, with each edge being noted as $e_\varepsilon=(v_\tau, c_\delta)$ where $\varepsilon=1, 2, \ldots, E$ indicates that this edge connects with the $\tau^{th}$ VN sub-layer and the $\delta^{th}$ CN sub-layer. Moreover, the neuron corresponding to each edge is notated as $n_\varepsilon=(v_\tau, c_\delta)$.

In the simulation phase, the updating and calculating process of the LLR values in the VN sub-layer and CN sub-layer is the same as that in the training phase, except that the last CN sub-layer $l_{c_1,g-1}^{(t)}$ of the hidden layer t will send the updated check LLR value to the output convolutional layer $l_o^{(t)}$, that is, the check LLR values of E neurons in the CN sub-layer $l_{c_1,g-1}^{(t)}$ need to be calculated according to the Tanner graph and mapped to N neurons in the output convolutional layer $l_o^{(t)}$ and the calculation process in the output convolutional layer $l_o^{(t)}$ is expressed as:

$$l_{v_\tau}^{(t)} = l_\tau + \sum_{n_{\varepsilon'}=(v_{\tau'},c_\delta)} l_{\varepsilon'}^{(l_{c_1,\gamma}^{(t)})};$$

where $n_{\varepsilon'}=(v_\tau, c_\delta)$ represents all the neurons in $l_{c_1,\gamma}^{(t)}$. It can be understood that if the hidden layer t is not the last hidden layer at this time, then the output convolutional layer $l_o^{(t)}$ will pass the check LLR value from the CN sub-layer $l_{c_1,g-1}^{(t)}$ to the first VN sub-layer $l_{v,0}^{(t+1)}$ of the next hidden layer; and if it is the last hidden layer, then a VN posteriori parameter of the hidden layer t, i.e., a posteriori variable LLR, can be calculated based on the computational formula of the output convolutional layer $l_o^{(t)}$ as the simulation prediction result.

Figure 6:
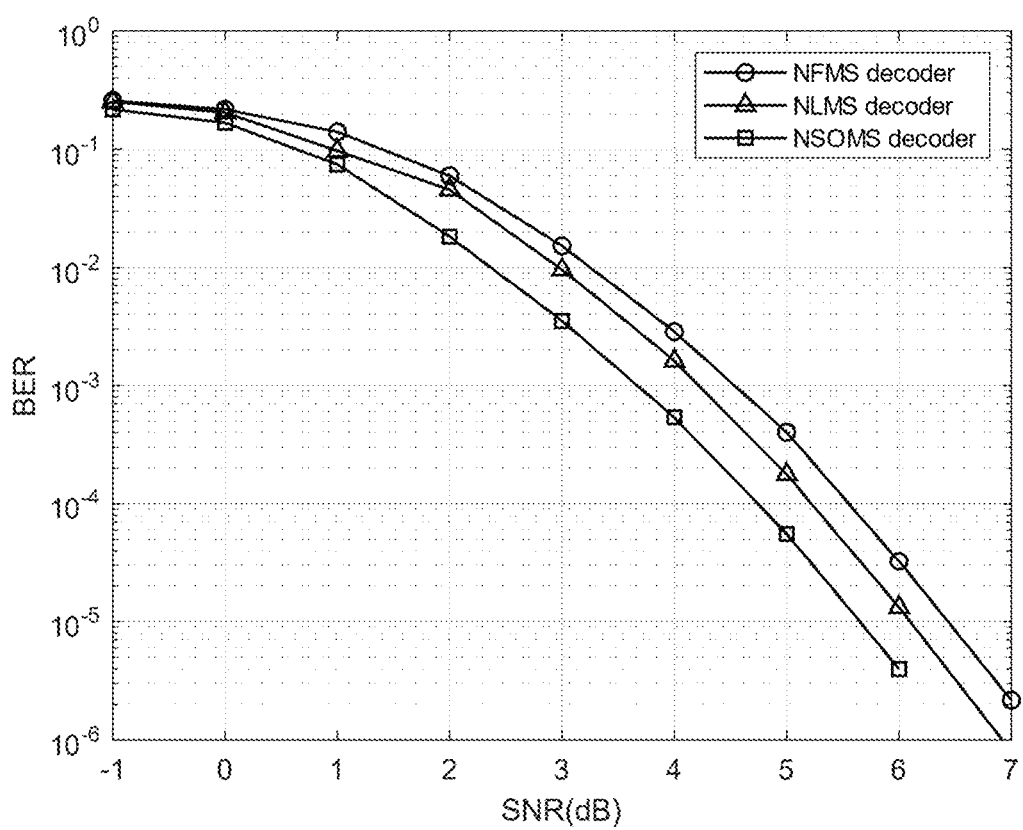
FIG. 6 shows bit error rate (BER) simulation curves of a neural flooding min-sum (NFMS) decoder, a neural layered min-sum (NLMS) decoder, and a neural shuffled offset min-sum (NSOMS) decoder according to an embodiment of the present disclosure.
Figure 7:
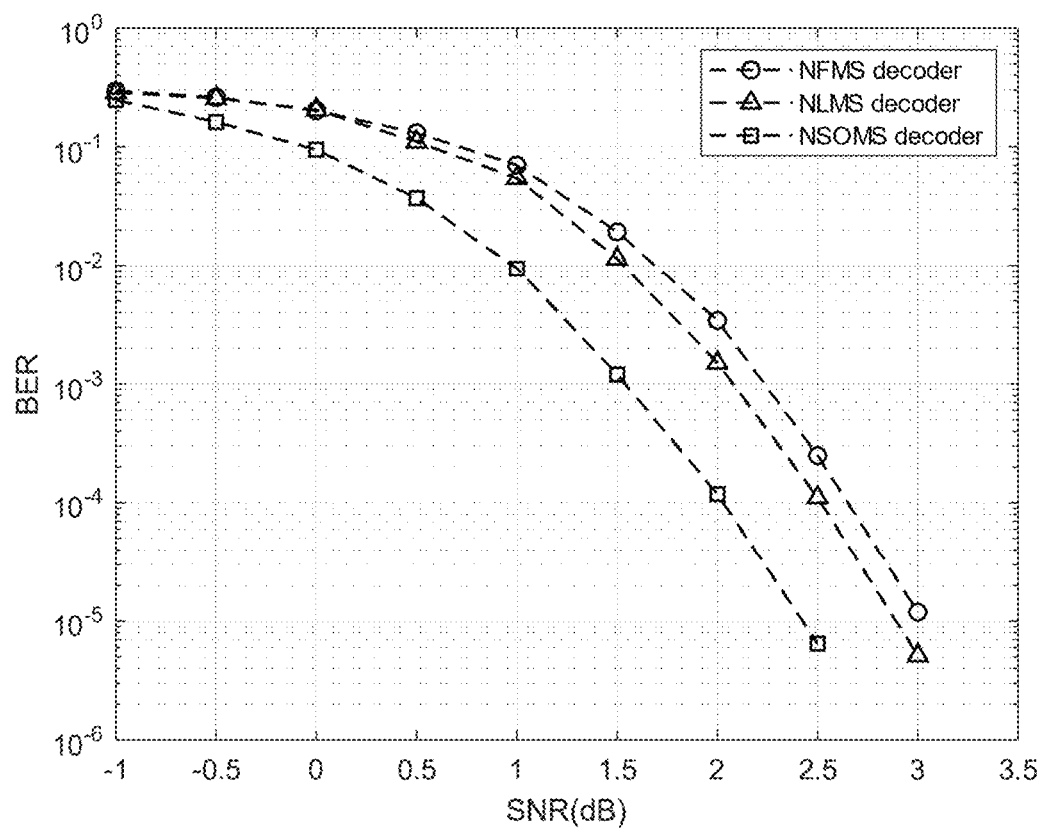
FIG. 7 shows BER simulation curves of the NFMS decoder, the NLMS decoder and the NSOMS decoder according to an embodiment of the present disclosure.

For better understanding, the present application also provides simulation application examples for comparing the decoding effects between various different decoders, and the decoders involved in the comparison include the NFMS decoder, the NLMS decoder, and the neural shuffled offset min-sum (NSOMS) decoder, in which the NSOMS decoder is the protograph neural decoder constructed based on a preset shuffled BP sub-network layer proposed in this application, i.e., two existing decoders are compared and analyzed with the NSOMS decoder provided in this application. Referring to FIGS. 6 and 7, bit error rate performance simulations are performed under the AWGN channel of the protograph LDPC neural decoder at BG2 of 5G LDPC, where the code rate of BG2 is R=⅕; replication times are F=3 and F=16, respectively; the maximum number $Ep_{max}$ of steps of the neural decoder is 1600; and the maximum number of the hidden layer is T=10. FIG. 6 shows the comparison of the decoding effect for the replication number F=3, and FIG. 7 shows the comparison of the decoding effect for F=16.

It can be seen from FIGS. 6 and 7, the NSOMS decoder provided in this application has a better bit error performance than the other decoder, indicating that the NSOMS decoder provided herein can improve the performance of the protograph LDPC neural decoding system.

The training method based on the improved protograph neural decoder provided in the present application improves the network structure of the protograph LDPC neural decoder based on a preset shuffled BP sub-network layer. The preset shuffled BP sub-network layer can ensure the training efficiency of the network while reducing the training complexity by increasing the network shunt. Moreover, the preset mean-square error loss function is adopted herein instead of the loss function in the prior art to optimize the network training process, which can accelerate the convergence speed of network training and improve the training efficiency. Therefore, this application can solve the technical problems of higher overall complexity and lower training efficiency due to the difficulty of convergence in the training process when adopting the inefficient single-stream structure in the prior art.

Figure 2:
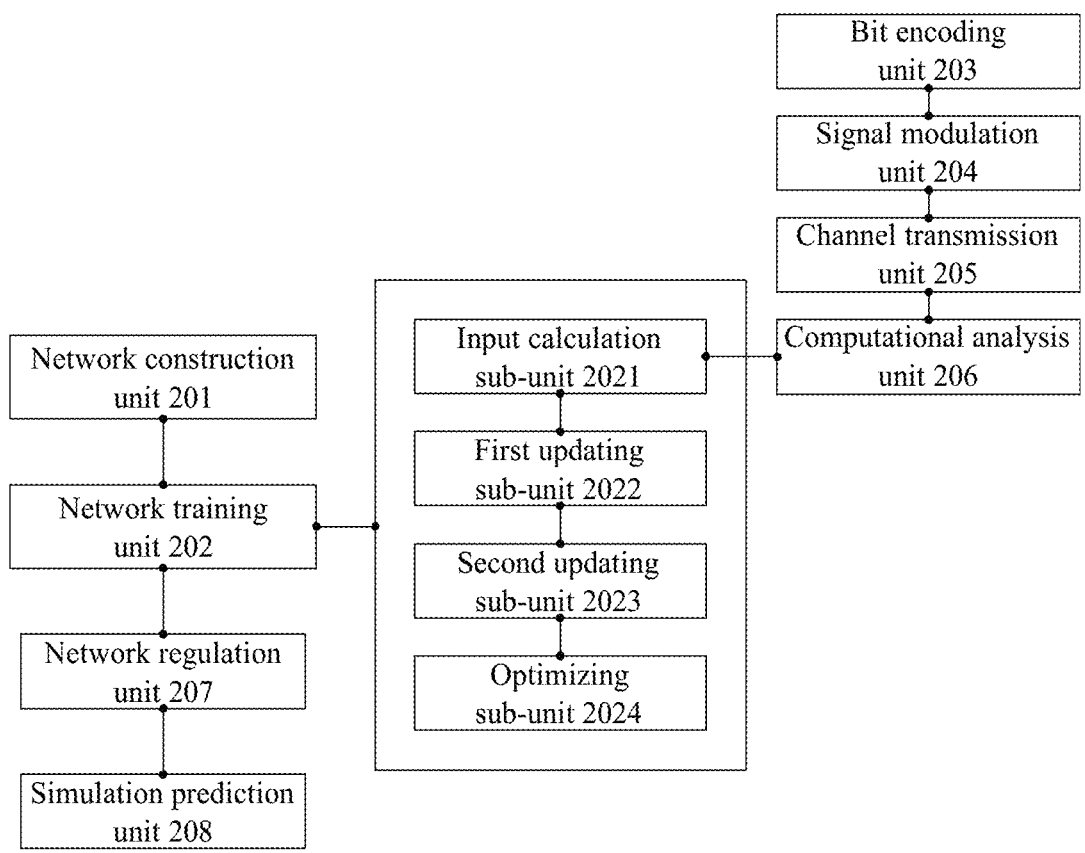
FIG. 2 is a schematic diagram of a training device based on an improved protograph neural decoder according to an embodiment of the present disclosure.

For better understanding, referring to FIG. 2, this application provides a training device based on an improved protograph neural decoder, which includes a network construction unit 201 and a network training unit 202.

The network construction unit 201 is configured to construct a to-be-trained decoding network based on an initial variable sub-network layer, an initial check sub-network layer and a preset shuffled BP sub-network layer, where the to-be-trained decoding network comprises a plurality of hidden layers and an input convolutional layer.

The network training unit 202 is configured to update and train the initial variable sub-network layer, the initial check sub-network layer and the preset shuffled BP sub-network layer by calculating LLR based on a preset mean square error loss function and a preset decoder objective function to obtain a target protograph neural decoder.

The preset mean square error loss function is configured to calculate a loss value between output information of the check sub-network layer and output information of the preset shuffled BP sub-network layer.

The target protograph neural decoder comprises an optimized variable sub-network layer, an optimized check sub-network layer and an optimized shuffled BP sub-network layer.

Further, the network construction unit 201 is specifically configured to successively connect the initial variable sub-network layer, the initial check sub-network layer and the preset shuffled BP sub-network layer to obtain a hidden network group, successively connect a plurality of hidden network groups to form a hidden layer, and successively connect the plurality of hidden layers after the input convolutional layer to obtain the to-be-trained decoding network.

Further, the network training unit 202 includes an input calculation sub-unit 2021, a first updating sub-unit 2022, a second updating sub-unit 2023 and an optimizing sub-unit 2024.

The input calculation sub-unit 2021 is configured to map preset channel initial information to the input convolutional layer of the to-be-trained decoding network for convolutional computation according to a Tanner graph to obtain input convolutional information.

The first updating sub-unit 2022 is configured to update and analyze the input convolutional information through the initial variable sub-network layer to obtain variable output information and a variable LLR value, and send the variable output information and the variable LLR value to the initial check sub-network layer and the preset shuffled BP sub-network layer;

The second updating sub-unit 2023 is configured to update and analyze the variable output information and the variable LLR value through the initial check sub-network layer and the preset shuffled BP sub-network layer to obtain a checked LLR value, checked output information and shuffled output information, wherein the checked LLR value is configured for parameter updating calculation of a next initial variable sub-network layer; and The optimizing sub-unit 2024 is configured to perform optimized network training on the checked output information and the shuffled output information based on the preset mean square error loss function and the preset decoder objective function to obtain the target protograph neural decoder.

The training device further includes a bit encoding unit 203, a signal modulation unit 204, a channel transmission unit 205 and a computational analysis unit 206.

The bit encoding unit 203 is configured to encode an original information bit sequence with a protograph encoder to obtain a coded bit sequence.

The signal modulation unit 204 is configured to perform signal modulation on the coded bit sequence with a binary phase shift keying modulator to obtain a modulated symbol sequence.

The channel transmission unit 205 is configured to analyze channel transmission characteristics of the modulated symbol sequence based on AWGN to obtain channel transmission information.

The computational analysis unit 206 is configured to perform probabilistic analysis calculation on the channel transmission information to obtain the preset channel initial information.

The training device further includes a network regulation unit 207 and a simulation prediction unit 208.

The network regulation unit 207 is configured to eliminate the optimized shuffled BP sub-network layer in the target protograph neural decoder, and provide an output convolutional layer at an end of each of the plurality of hidden layers to obtain a simulated protograph neural decoder, where the output convolutional layer comprises a plurality of neurons.

The simulation prediction unit 208 is configured to perform signal decoding and simulation with the simulated protograph neural decoder, and compute a posteriori variable LLR through the output convolutional layer based on output information of the last optimized check sub-network layer to obtain a simulated prediction result.

It should be understood that the devices and methods disclosed in the above embodiments can be realized in other ways. For example, the device described in the above embodiments are merely schematic. The division of the units is merely a logical functional division, and the units may be divided in other ways in actual implementations. Multiple units or components may be combined or may be integrated into another system, or some features may be ignored or not implemented. In addition, the coupling or direct coupling or communication connection between each other shown or discussed may be an indirect coupling or a communication connection through an interface, device or unit, which may be electrical, mechanical or otherwise.

Units illustrated as separated components may be or not be physically separated, and components shown as units may be or not be physical units, i.e., they may be located in a single place or may also be distributed over a plurality of network units. Some or all of these units may be selected to achieve the solutions in the embodiments according to actual needs.

In addition, individual functional units in various embodiments of the present application may be integrated in a processing unit or may physically exist separately, or two or more units may be integrated in a single unit. The integrated units may be realized either in the form of hardware or in the form of software functional units.

The integrated unit may be stored in a computer-readable storage medium if it is realized in the form of a software functional unit and sold or used as a separate product. Based on this, the technical solutions of the present application may be essentially or in part as a contribution to the prior art embodied in the form of a software product, or all or part of the technical solution may be embodied in the form of a software product. The software product is stored in a storage medium including a number of instructions for executing all or part of steps of the method described in the various embodiments of the present application by means of a computer device (which may be a personal computer, a server, or a network device, etc.). The aforementioned storage media include a USB flash drive, a removable hard disk, a read-only memory (ROM), a random access memory (RAM), a diskette, a compact disc, and other types of media that can store program codes.

The above embodiments are only used to illustrate the technical solutions of the present application, and are not intended to limit the present disclosure. Although the present application has been described in detail with reference to the foregoing embodiments, one of ordinary skill in the art should understand that the technical solutions in the foregoing embodiments can still be modified, or some of the technical features therein may be replaced with their equivalents. Those modifications or replacements made without departing from the spirit and scope of the present application shall fall within the scope of the present application defined by the appended claims.

What is claimed is:

1. A training method based on an improved protograph neural decoder, comprising:
    constructing a to-be-trained decoding network based on an initial variable sub-network layer, an initial check sub-network layer and a preset shuffled belief-propagation (BP) sub-network layer, wherein the to-be-trained decoding network comprises a plurality of hidden layers and an input convolutional layer; and the to-be-trained decoding network is constructed through steps of:
        successively connecting the initial variable sub-network layer, the initial check sub-network layer and the preset shuffled BP sub-network layer to obtain a hidden network group; and
        successively connecting a plurality of hidden network groups to form a hidden layer; and successively connecting the plurality of hidden layers after the input convolutional layer to obtain the to-be-trained decoding network; and
    updating and training the initial variable sub-network layer, the initial check sub-network layer and the preset shuffled BP sub-network layer by calculating log-likelihood ratio (LLR) based on a preset mean square error loss function and a preset decoder objective function to obtain a target protograph neural decoder;
        wherein the preset mean square error loss function is configured to calculate a loss value between output information of the check sub-network layer and output information of the preset shuffled BP sub-network layer; and
    the target protograph neural decoder comprises an optimized variable sub-network layer, an optimized check sub-network layer and an optimized shuffled BP sub-network layer.

2. The training method of claim 1, wherein the step of updating and training the initial variable sub-network layer, the initial check sub-network layer and the preset shuffled BP sub-network layer by calculating LLR based on a preset mean square error loss function and a preset decoder objective function to obtain a target protograph neural decoder comprises:
    mapping preset channel initial information to the input convolutional layer of the to-be-trained decoding network for convolutional computation according to a Tanner graph to obtain input convolutional information;
    updating and analyzing the input convolutional information through the initial variable sub-network layer to obtain variable output information and a variable LLR value; and sending the variable output information and the variable LLR value to the initial check sub-network layer and the preset shuffled BP sub-network layer;
    updating and analyzing the variable output information and the variable LLR value through the initial check sub-network layer and the preset shuffled BP sub-network layer to obtain a checked LLR value, checked output information and shuffled output information, wherein the checked LLR value is configured for parameter updating calculation of a next initial variable sub-network layer; and
    optimizing network training according to the checked output information and the shuffled output information based on the preset mean square error loss function and the preset decoder objective function to obtain the target protograph neural decoder.

3. The training method of claim 2, wherein before mapping the preset channel initial information to the input convolutional layer of the to-be-trained decoding network for convolutional computation according to the Tanner graph to obtain the input convolutional information, the training method further comprises:
    encoding an original information bit sequence with a protograph encoder to obtain a coded bit sequence;
    performing signal modulation on the coded bit sequence with a binary phase shift keying modulator to obtain a modulated symbol sequence;
    analyzing channel transmission characteristics of the modulated symbol sequence based on additive white Gaussian noise (AWGN) to obtain channel transmission information; and
    performing probabilistic analysis on the channel transmission information to obtain the preset channel initial information.

4. The training method of claim 1, wherein after the step of updating and training the initial variable sub-network layer, the initial check sub-network layer and the preset shuffled BP sub-network layer by calculating the LLR based on the preset mean square error loss function and the preset decoder objective function to obtain the target protograph neural decoder, the training method further comprises:
    eliminating the optimized shuffled BP sub-network layer in the target protograph neural decoder, and providing an output convolutional layer at an end of each of the plurality of hidden layers to obtain a simulated protograph neural decoder, wherein the output convolutional layer comprises a plurality of neurons; and performing signal decoding and simulation with the simulated protograph neural decoder; and calculating a posteriori variable LLR through the output convolutional layer based on output information of a last optimized check sub-network layer to obtain a simulated prediction result.

* * * * *